United States Patent
Hosotani et al.

(10) Patent No.: US 6,561,408 B2
(45) Date of Patent: May 13, 2003

(54) BONDING HEAD AND COMPONENT MOUNTING APPARATUS

(75) Inventors: Naoto Hosotani, Osaka (JP); Shuji Ono, Kobe (JP); Hidenobu Nishikawa, Ikoma (JP); Mitsuo Maeno, Kadoma (JP); Hiroshi Nasu, Neyagawa (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/043,158

(22) Filed: Jan. 14, 2002

(65) Prior Publication Data

US 2002/0092887 A1 Jul. 18, 2002

(30) Foreign Application Priority Data

Jan. 17, 2001 (JP) ......................................... 2001-008824

(51) Int. Cl.[7] ........................ B23Q 15/00; B23Q 16/00; B23K 37/00
(52) U.S. Cl. .............................. 228/44.7; 228/9; 228/45
(58) Field of Search .............................. 228/8, 9, 44.7, 228/1.1, 102, 103, 110.1, 45, 55

(56) References Cited

U.S. PATENT DOCUMENTS

| | | | | |
|---|---|---|---|---|
| 3,700,156 A | * | 10/1972 | Hermanns | 228/6.2 |
| 4,875,614 A | * | 10/1989 | Cipolla et al. | 228/5.5 |
| 5,190,205 A | * | 3/1993 | Ozawa et al. | 228/44.7 |
| 5,212,880 A | * | 5/1993 | Nishiguchi et al. | 29/739 |
| 5,439,161 A | * | 8/1995 | Kawatani et al. | 228/180.21 |
| 5,683,026 A | * | 11/1997 | Kawatani et al. | 228/5.5 |
| 6,494,359 B1 | * | 12/2002 | Hasegawa | 228/102 |

FOREIGN PATENT DOCUMENTS

| | | | | |
|---|---|---|---|---|
| JP | | 03204949 A | * | 9/1991 |
| JP | | 06140467 A | * | 5/1994 |
| JP | | 2001-223244 | | 8/2001 |

* cited by examiner

*Primary Examiner*—M. Alexandra Elve
*Assistant Examiner*—Colleen Cooke
(74) *Attorney, Agent, or Firm*—Wenderoth, Lind & Ponack, L.L.P.

(57) ABSTRACT

There is provided an inclination prevention member for preventing a pressing part from inclining to a supporting part. Therefore a pressing face and a stage face can be arranged to be nearly parallel. The pressing face can be thus disposed with the higher parallelism to the bonding stage as compared with the conventional art, so that components and a circuit form object can be bonded with a high bonding quality.

20 Claims, 11 Drawing Sheets

BONDING HEAD AND COMPONENT MOUNTING APPARATUS

BACKGROUND OF THE INVENTION

The present invention relates to a bonding head for mounting electronic components to a circuit board and, a component mounting apparatus with the bonding head.

Conventionally, a spherical bearing is used as an example of parallel adjustment devices for the aforementioned bonding head. The spherical bearing can adjust parallelism of the bonding head by making a pressing tool of the bonding head follow an object such as a bonding stage or the like, thereby facilitating parallel adjustment.

One example of the bonding heads employing the spherical bearing in a parallel adjustment part will be described below with reference to drawings. FIG. 9 is a perspective view of the conventional bonding head and FIG. 10 is a sectional view of the bonding head. In these FIGS. 9 and 10, a spherical part 2 of a bonding head 1 is constituted so that a block 3 with a convex-shaped spherical part and a block 4 with a concave-shaped spherical part are to be brought in contact with each other. The block 3 is sucked and held to the block 4 by sucking the air to suction grooves 5 through a suction passage 6 formed in the block 4. Also the block 3 is attracted to the block 4 by a magnetic force of magnets 7 fitted to the block 4. To the block 3 is connected a cooling fin 8. A holder 9 coupled to the cooling fin 8 has a pressing tool 10 at a lower end of the holder, to which are inserted a heater 11 and a thermocouple 12 from the same direction. The holder 9 is accordingly heated by the heater 11 while its temperature is monitored by the thermocouple 12. A point "a" of the center of a lower face of the pressing tool 10 is made the center of a sphere of the spherical part 2. An electronic component 13 is mounted onto a circuit board 15 via a thermosetting adhesive 14. The circuit board 15 is placed on a bonding stage 16.

The bonding head in the above constitution operates as follows.

A bonding operation will be discussed in the first place.

The electronic component 13 is temporarily positioned on the circuit board 15 via the adhesive 14 in a precedent process. The circuit board 15 with the electronic component 13 temporarily positioned thereto is transferred by an outside transfer device not shown in the drawings and fixedly placed on the bonding stage 16. The bonding head 1 is lowered by an external driving device not shown in the drawings thereby pressing the electronic component 13 by the pressing tool 10. Since the pressing tool 10 is heated by the heat of the heater 11 via the holder 9 at this time, the heat of the pressing tool 10 is conducted to the adhesive 14 via the electronic component 13. As a result, setting of the adhesive 14 proceeds to complete joining the electronic component 13 and the circuit board 15. It is important to secure a high parallelism here between the electronic component 13 and the circuit board 15 so as to obtain a high quality of the joining. In other words, a parallelism between the pressing tool 10 and the bonding stage 16 is crucial for high-quality bonding.

An operation of adjusting the parallelism will now be described with reference to FIG. 10. The parallelism adjustment operation is carried out when it becomes necessary to replace the pressing tool 10 according to types of products to be produced. The parallelism adjustment operation is carried out without works, i.e., the electronic component 13 and the circuit board 15 loaded on the bonding stage 16. Although the work is illustrated in FIG. 10, actually no work is present during the parallelism adjustment operation.

Before the parallelism adjustment operation, the air is sucked through the suction passage 6, whereby the block 3 is sucked and held to the block 4 by an air suction force at the suction grooves 5.

In the parallel adjustment operation, a compressed air is first supplied to the suction passage 6 to release the above suction and holding to the block 3, while the block 3 is prevented from dropping because of a force of magnets 7 acting to hold the block 3. Consequently a gap of several—several tens μm is generated between the block 3 and the block 4 at the spherical part. The block 3 is rendered freely rotatable centering the point "a". On the other hand, since the holder 9 has the heater 11 and the thermocouple 12 equipped thereto in the same direction along a direction "b" as mentioned before, a turning moment in a direction "c" is given rise to the holder 9 by effects of weights of the heater 11 and the thermocouple 12 and drags of wiring lines 17 and 18. A lower part 19 of the bonding head which is made rotatable as above eventually comes to incline as shown in FIG. 11.

Then the bonding head 1 is moved down by the external driving device not shown in the drawings to press the pressing tool 10 to the bonding stage 16. The pressing tool 10 tends to follow the bonding stage 16 at its pressing face, hence rotating the block 3 about the point "a". After the rotation, the block 3 is sucked and held to the block 4 through suction of the air from the suction grooves 5.

In the bonding head 1 constituted as above, when the pressing tool 10 is to follow the bonding stage 16, drags of the wiring lines 17 and 18 of the heater 11 and the thermocouple 12 and weights of the heater 11 and the thermocouple 12 adversely effect to generate the drag to hinder the pressing tool from tracing the bonding stage. In consequence of this, a sufficient parallelism of the electronic component 13 to the circuit board 15 cannot be secured in the bonding operation. Thus, a contact state of electrodes between the electronic component 13 and the circuit board 15 varies. High-quality bonding cannot achieve in the conventional art.

SUMMARY OF THE INVENTION

The present invention is devised to solve the above problem and has for its object to provide a bonding head in which a pressing face can be arranged to a bonding stage with a higher parallelism than in the conventional art, and a component mounting apparatus with the bonding head.

In order to accomplish the aforementioned objective, according to a first aspect of the present invention, there is provided a bonding head for pressing a component to a circuit form object with a pressing face brought in contact with the component, which comprises:

a pressing part having the flat pressing face which comes in contact with the component on a circuit form object placed on a stage face of a bonding stage;

a supporting part for supporting the pressing part while allowing the pressing part to freely swing; and an inclination prevention member for preventing the pressing part from inclining to the supporting part in consequence to the swing of the pressing part so as to make the pressing face nearly parallel to the stage face.

As described above, the bonding head of the first aspect of the present invention is provided with the inclination prevention member. The pressing part is prevented by the inclination prevention member from inclining to the supporting part, so that the pressing face is made nearly parallel to the stage face. Therefore the pressing face can be arranged with a higher parallelism to the bonding stage in comparison with the conventional art. Thus components and a circuit form object can be bonded with the high bonding quality.

The above inclination prevention member may be constituted of a heating member for heating the component, which is included in the pressing part, and includes a heating element for heating the pressing face and a heat detector for detecting heat caused by the heating element thereby controlling a temperature of the heating element, to which the heating element and the heat detector are loaded with directions to offset the swing of the pressing part brought about by the heating element and the swing of the pressing part brought about by the heat detector.

The inclination of the pressing part to the supporting part can be prevented by constituting the heating member as the inclination prevention member, the heating member having the heating element and the heat detector attached to the heating member in directions in which the swing of the pressing part by the heating element is offset by the swing of the pressing part by the heat detector. The pressing face and the stage face can accordingly be arranged to be nearly parallel.

In the bonding head, a coating material of wiring lines connected to the heating element and the heat detector can be formed of a material permitting parallel adjustment to the pressing part, the operation making the pressing face and the stage face parallel to each other when the pressing face is brought in contact with the stage face.

The coating material used for the wiring lines connected to the heating element and the heat detector is one that permits the parallel adjustment for the pressing part to make the pressing face and the stage face parallel to each other when the pressing face is brought in contact with the stage face. Accordingly the pressing part can be prevented from inclining to the supporting part and the pressing face and the stage face are brought in the state to be nearly parallel.

The heating member of the bonding head may be formed symmetric with respect to a center axis of the heating member in two mutually orthogonal directions each orthogonal to a thickness direction of the component to be pressed by the pressing face.

When a shape of the heating member is formed in a symmetric shape, the heating member can be balanced in weight, thus preventing the pressing part from inclining to the supporting part to enable the pressing face and the stage face to be arranged nearly in parallel. The pressing face can be disposed to the bonding stage with the higher parallelism as compared with the conventional art.

The above pressing face may be formed to have a size which is larger than an entire face of the component and makes the pressing part generate a rotational force for allowing the pressing face and the stage face to be parallel when the pressing face is brought in contact with the stage face.

The pressing face is formed in the size by which the rotational force for making the pressing face and the stage face be parallel when the pressing face is brought in contact with the stage face is generated to the pressing part. Therefore since the rotational force for making the pressing face and the stage face be in the parallel state is generated when the pressing face is brought in contact with the stage face, the pressing face and the stage face can be easily arranged to be nearly parallel to each other. The pressing face can thus be disposed with the higher parallelism to the bonding stage in comparison with the conventional art.

When the component includes a pressing prohibition portion, the pressing face may be provided with a non-pressing portion corresponding to the pressing prohibition portion.

The non-pressing portion is provided to the pressing face for components including pressing prohibition portions, whereby the components can be mounted without being deteriorated in quality.

The inclination prevention member may be constituted of a weight attached to the pressing part for making the pressing part generate a rotational force for allowing the pressing face and the stage face to be nearly parallel.

By attaching the weight to the pressing part as the inclination prevention member, the weight balance of the pressing part can be obtained, so that the pressing part is prevented from inclining to the supporting part and the pressing face can be arranged to be nearly parallel to the stage face. The pressing face can be arranged with the higher parallelism to the bonding stage in comparison with the conventional art.

Furthermore, the inclination prevention member can be constituted of an urging mechanism attached to the supporting part for applying to the pressing part a rotational force for allowing the pressing face and the stage face to be nearly parallel.

With the urging mechanism being attached as the inclination prevention member to the supporting part, the rotational force for making the pressing face and the stage face be nearly parallel can be applied to the pressing part, whereby the pressing part is prevented from inclining to the supporting part and the pressing face can be arranged in nearly parallel state to the stage face. The pressing face can be arranged with the higher parallelism to, the bonding stage than in the conventional art.

When the heating member further includes a suction passage opened to the pressing face for sucking the component to the pressing face, the inclination prevention member can be a tubular member which is attached to the heating member, communicates with the suction passage and is formed of a material or in a size to prevent the inclination.

When the pressing part is equipped with the suction passage for sucking the component, the material of the tube communicating with the suction passage, as the inclination prevention member, is formed of material or size in which the inclination of the pressing part to the supporting part is prevented. The pressing face and the stage face can be set nearly parallel to each other, and the pressing face can be arranged with the higher parallelism to the bonding stage as compared with the conventional art.

A component mounting apparatus is provided according to a second aspect of the present invention which comprises:

a bonding head of the first aspect; and a transfer device for feeding the circuit form object with the component placed thereon onto the stage face of the bonding stage and sending out the circuit form object from the stage face, wherein the component on the circuit form object fed onto the stage face by the transfer device is mounted on the circuit form object while pressing by the bonding head.

The component mounting apparatus according to the second aspect of the present invention has the bonding head of the above first aspect. Since the pressing face can be arranged with the higher parallelism to the bonding stage than in the conventional art, components and a circuit form object can be bonded with the higher bonding quality.

In the above second aspect may be also included a driving device for moving the bonding head in a thickness direction of the component and a controller for controlling the driving device to operate, wherein the controller controls the driving device to move the bonding head in the thickness direction with a larger force at a parallel adjustment operation when a flat pressing face which is to come in contact with the component is brought in contact with the stage face to make the pressing face and the stage face parallel than a force at a pressing operation when the pressing face is brought in contact with the component to press the component to the circuit form object.

The component mounting apparatus of the second aspect further includes the controller for controlling to press the pressing face with a larger force to the stage face at the parallel adjustment than a force of the component to the circuit form object. Therefore, the pressing face is more easily arranged in the parallel state to the stage face, enabling bonding the components and circuit form object with the higher bonding quality.

BRIEF DESCRIPTION OF THE DRAWINGS

These and other objects and features of the present invention will become clear from the following description taken in conjunction with the preferred embodiments thereof with reference to the accompanying drawings in which.

DETAILED DESCRIPTION OF THE PREFERRED EMBODIMENTS

Figure 1:
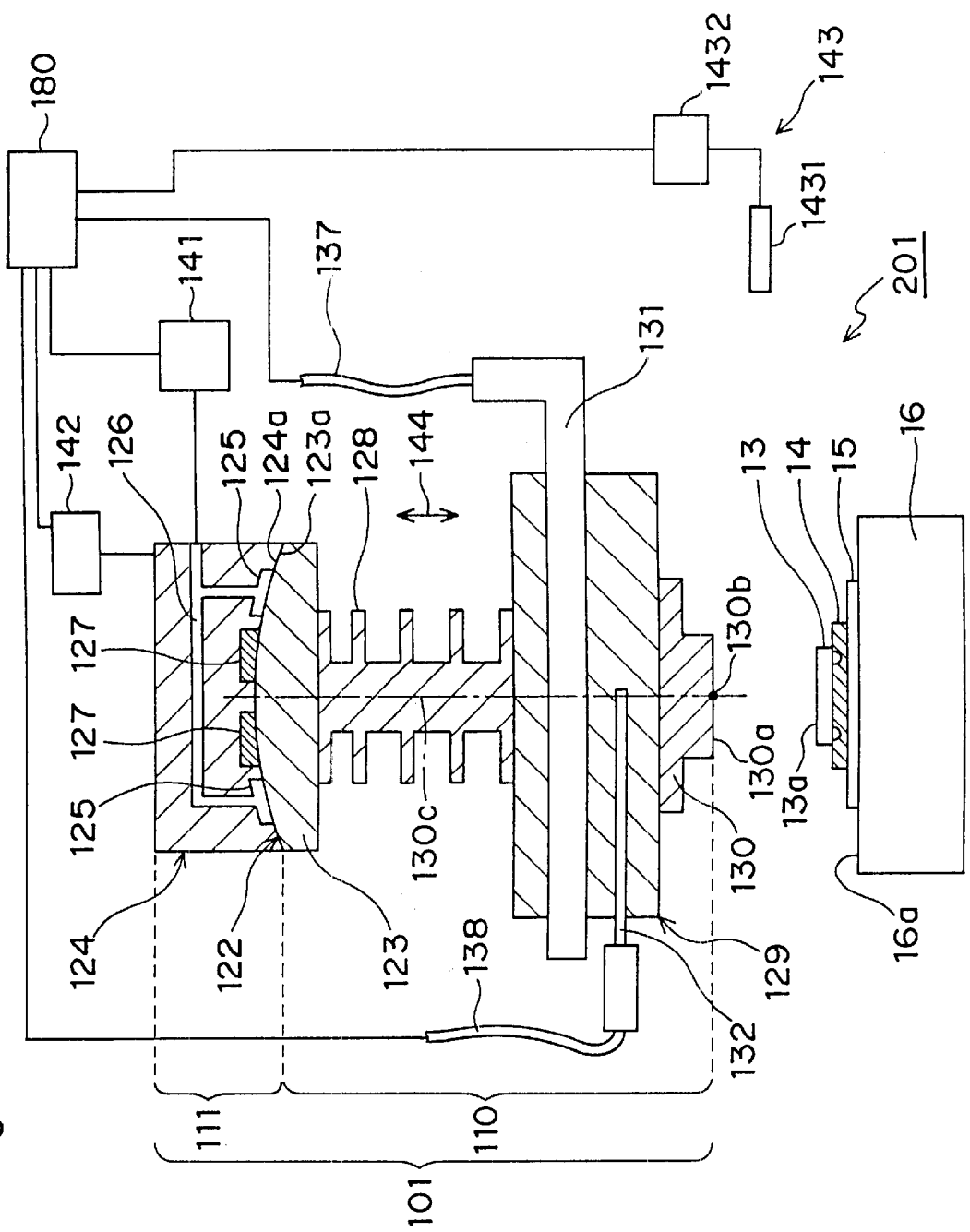
FIG. 1 is a sectional view of a bonding head in an embodiment of the present invention.

A bonding head according to preferred embodiments of the present invention and a component mounting apparatus with the bonding head will be described below with reference to the drawings. It is to be noted that like parts are designated by like reference numerals. In the specification, a circuit form object implies circuit boards such as resin boards, paper based phenolic resin boards, ceramic boards, glass fabric based epoxy resin boards, film boards, etc., single-layer substrates, multilayered substrates and the like circuit boards, components, casings, frames and the like having circuits formed thereto. A circuit board is employed by way of example of the circuit form object and an electronic component is employed as an example of the component to be mounted to the circuit board in the embodiments.

Figure 2:
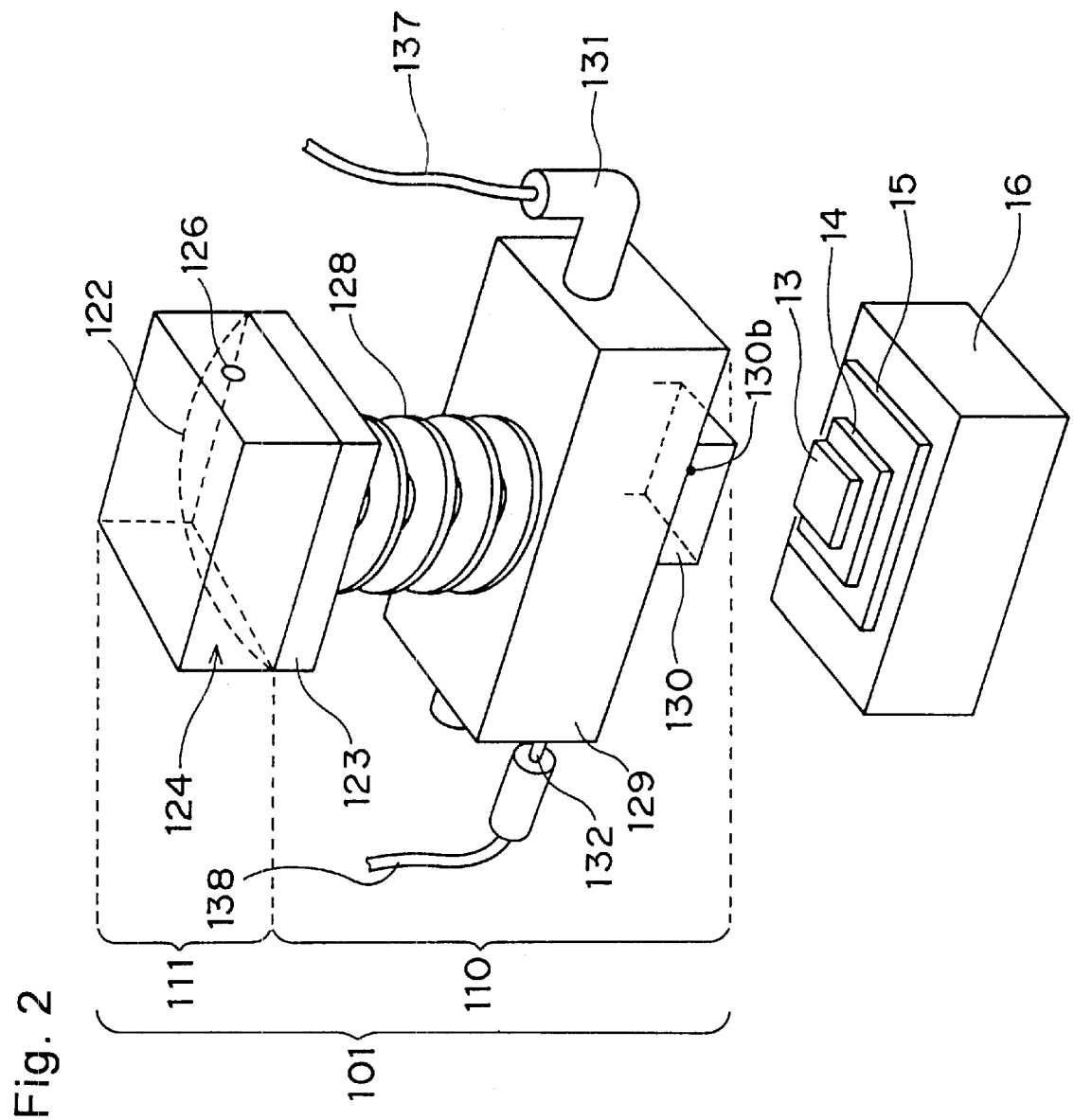
FIG. 2 is a perspective view of the bonding head in FIG. 1.

Referring to FIGS. 1 and 2, a bonding head 101 of the embodiment roughly comprises a pressing part 110 and a supporting part 111 for supporting the pressing part 110 while allowing the pressing part to freely swing. The bonding head 101 presses an electronic component 13 on a circuit board 15 loaded on a stage face 16a of a bonding stage 16 against the circuit board 15. The pressing part 110 and the supporting part 111 are coupled at a spherical part 122 constituting the so-called spherical bearing. The electronic component 13 is placed on the circuit board 15 via a thermosetting adhesive 14. A suction and feed air device 141, a driving device 142, a transfer device 143 and a controller 180 which will be described later are omitted from the illustration in FIG. 2 and also FIGS. 4–6 to be referred to later.

The supporting part 111 includes a recessed block 124 with a concave spherical face 124a which constitutes the above spherical part 122. Suction grooves 125 opened to the spherical face 124a, a suction passage 126 communicating with the suction grooves 125, and magnets 127 embedded to be exposed to the spherical face 124a are equipped in the recessed block 124. The suction and feed air device 141 which is controlled by the controller 180 to operate is connected to the suction passage 126.

The pressing part 110 roughly includes a projecting block 123, a cooling fin 128, a heating member 129 and a pressing tool 130.

The projecting block 123 has a convex spherical face 123a to meet the spherical face 124a of the recessed block 124 to constitute the spherical part 122 together with the concave face 124a. The recessed block 124 and the projecting block 123 contact each other at the spherical part 122. The projecting block 123 is fixed to the recessed block 124, that is, the pressing part 110 is fixed to the supporting part 111 by both a magnetic force with magnets 127 and suction when the suction and feed air device 141 sucks via the suction passage 126 and the suction grooves 125. In contrast, the projecting block 123 is supported to the recessed block 124 only by the magnetic force of magnets 127 when the suction is stopped, so that the projecting block 123 becomes able to slide at the spherical part 122 to the recessed block 124 and swing along the spherical face 124a.

The cooling fin 128 has one end coupled to the above projecting block 123 and the other end coupled to the heating member 129.

According to the present embodiment, the heating member 129 corresponds to an example of an inclination prevention member. The inclination prevention member prevents the pressing part 110 from inclining with respect to the supporting part 111 as a result of the swing or movement of the pressing part 110, thereby arranging a pressing face 130a of the pressing tool 130 and the stage face 16a to be parallel or nearly parallel to each other. The pressing tool 130 having the pressing face 130a disposed opposite to the electronic component 13 to be in contact with the electronic component 13 is detachably fitted to the heating member 129. The heating member 129 has a heater 131 and a thermocouple 132 inserted thereinto from opposite directions to each other. The heater 131 as an example of a heating element heats the pressing face 130a for setting the thermosetting adhesive 14. The heat from the heating element is detected by the thermocouple 132 which is an example of a heat detector.

The directions of the insertion of the heater 131 and the thermocouple 132 to the heating member 129 are not limited to the aforementioned directions opposite to each other. Namely, the heating element and the heat detector can be arranged to the heating member 129 in a direction to offset a swing or movement of the pressing part 110 caused by the heating element and a swing or movement of the pressing part 110 by the heat detector.

The heater 131 and the thermocouple 132 are connected respectively via wiring lines 137 and 138 to the controller 180. The heating member 129 is heated by the heater 131 with its temperature being monitored by the thermocouple 132.

A center of a sphere forming the spherical faces 123a and 124a is in existence on the pressing face 130a so as to prevent the pressing face 130a from being displaced in a horizontal direction when the pressing face 130a is let to follow the bonding stage.

The driving device 142 controlled to operate by the controller 180 is connected to the bonding head 101 constituted as above. The driving device 142 is fitted, e.g., to the supporting part 111 to press and mount the electronic component 13 to the circuit board 15 by moving the bonding head 101 in a thickness direction 144 of the electronic component 13.

A component mounting apparatus 201 can be constructed including the above-formed bonding head 101 and the transfer device 143 for transferring the circuit board 15 with the electronic component 13 placed thereon via the adhesive 14 to the stage face 16a of the bonding stage 16 and for sending out the circuit board 15 from the stage face 16a. The transfer device 143 is provided with a holding part 1431 for holding the circuit board 15 and the electronic component 13, and a driving part 1432 for moving the holding part 1431 in two directions orthogonal to the thickness direction 144.

An operation of the above bonding head 101 will be depicted below. Since an operation of pressing to mount the electronic component 13 to the circuit board 15 while heating the electronic component is the same as that executed in the conventional art described earlier, the description thereof will be omitted here.

Hereinbelow will therefore be discussed a parallel adjustment operation carried out while the circuit board 15, etc. are not present on the stage face 16a of the bonding stage 16 for making the stage face 16a and the pressing face 130a of the pressing tool 130 parallel to each other.

This parallel adjustment operation is executed in a case of replacing the pressing tool 130 in accordance with switching types of products and in a state without the circuit board 15 and the like loaded on the bonding stage 16.

Prior to the parallel adjustment operation, the air has been sucked via the suction passage 126 by the suction and feed air device 141, whereby the projecting block 123 is sucked and held to the recessed block 124 by air suction force at the suction grooves 125.

When the parallel adjustment is started, a compressed air is supplied by the suction and feed air device 141 to the suction passage 126 to relieve the suction and holding to the projecting block 123. Since magnets 127 exert a force for lifting the projecting block 123 at this time, the projecting block 123 is prevented from dropping and a gap of several to several tens μm is generated between the projecting block 123 and the recessed block 124 at the spherical part 122. The projecting block 123, namely, the pressing part 110 is consequently brought in a state to be easily rotatable about the center of the sphere constituting the spherical face 123a and the spherical face 124a, that is, brought in a state to be able to move or swing with respect to the fixed supporting part The heater 131 and the thermocouple 132 are led out in opposite directions to each other with respect to the heating member 129 as described before. Therefore, even in the state in which the pressing part 110 is rotatable, a quantity of turning moment generated to the heating member 129 by effects of weights of the heater 131 and the thermocouple 132 and drags of the wiring lines 137 and 138 is small, enabling the pressing face 130a of the pressing tool 130 to be maintained nearly parallel to the stage face 16a.

The bonding head 101 is then lowered by the driving device 142 in the thickness direction 144. The pressing face 130a of the pressing tool 130 is pressed against the stage face 16a of the bonding stage 16. The pressing makes the pressing face 130a of the pressing tool 130 follow the stage face 16a, in other words, acts to make the pressing face 130a parallel to the stage face 16a. The pressing part 110 rotates about the center of the sphere having the spherical faces 123a and 124a, with changing a relative position between the recessed block 124 and the projecting block 123 at the spherical part 122. This operation of pressing the pressing face 130a against the stage face 16a thereby bringing the pressing face 130a and the stage face 16a in a state to be parallel to each other is the parallel adjustment operation.

While the pressing face 130a and the stage face 16a are kept in parallel as above, the air is sucked through the suction grooves 125 by the suction and feed air device 141 to suck and hold the pressing part 110 to the supporting part 111. The pressing part 110 is thus secured to the supporting part 111 in the state with the pressing face 130a and the stage face 16a being kept in parallel.

In the above parallel adjustment operation, the controller 180 controls the driving device 142 to press the pressing face 130a against the stage face 16a with a larger force than when the pressing face 130a presses the electronic component 13 against the circuit board 15. The pressing part 110 is enabled by this way of control to swing against a restricting force of restricting the swing of the pressing part 110. The parallel state of the pressing face 130a and the stage face 16a can hence be more easily achieved.

According to the bonding head 101 of the above-described embodiment, the heater 131 and the thermocouple 132 are connected at the heating member 129 to the wiring lines 137 and 138 in mutually opposite directions. Therefore, a swing force to the heating member 129 by the heater 131 acts in an opposite direction to a direction of a swing force acting to the heating member 129 by the thermocouple 132 and is consequently offset by the swing force by the thermocouple 132. Even when the pressing part 110 is brought in a state to be able to move or swing to the supporting part 111, the heating member 129 hardly inclines in directions orthogonal to the thickness direction 144. The restricting force of hindering the pressing part 110 from swinging at the parallel adjustment operation when the pressing part 110 with the heating member 129 is to be swung is reduced as compared with the conventional art. The pressing face 130a and the stage face 16a can accordingly be surely made parallel to each other. Since a parallelism of the electronic component 13 to the circuit board 15 during bonding operation is secured enough, the bonding is enabled with a high bonding quality.

Figure 7:
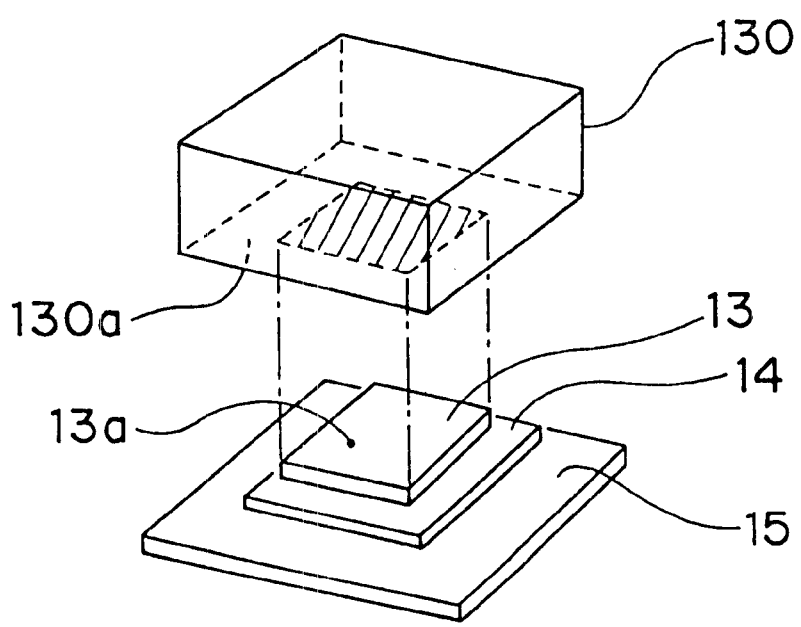
FIG. 7 is a perspective view showing a size relationship between a pressing face of a pressing part of the bonding head of FIG. 1 and a face to be pressed of a component.

As shown in FIG. 7, the pressing face 130a of the above bonding head 101 is preferably of a size larger than a total face of a face 13a to be pressed of the electronic component 13, and further so that a rotational force to make the pressing face 130a and the stage face 16a parallel to each other in the parallel adjustment operation when the pressing face 130a is brought in contact with the stage face 16a is generated to the pressing part 110.

By forming the pressing face 130a to be of the size, a turning moment to be generated to the pressing part 110 at the parallel adjustment operation is increased as compared with the conventional art, thus enabling the pressing face 130a and the stage face 16a to be arranged in the parallel state.

Figure 8:
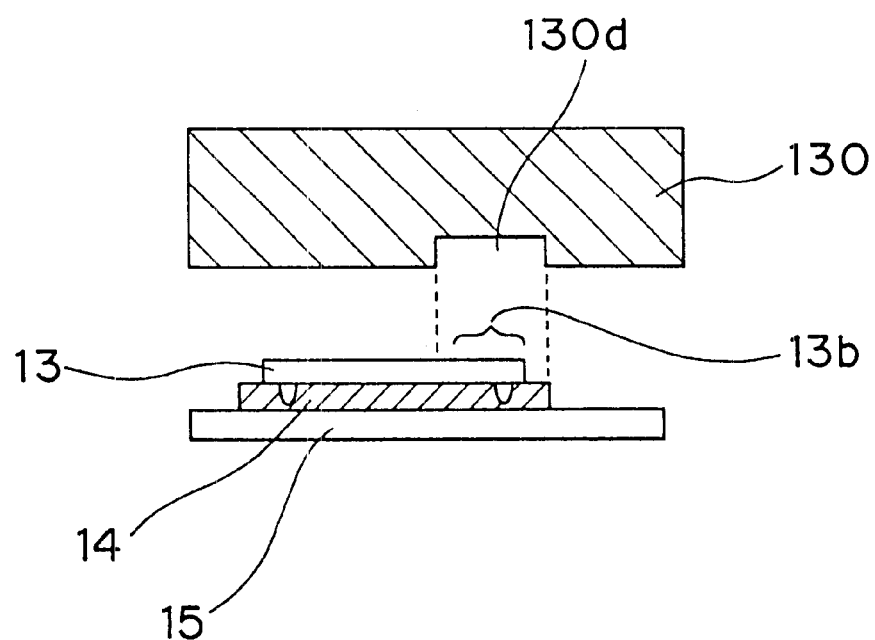
FIG. 8 is a sectional view of a pressing part in a fifth modified example of the bonding head of FIG. 1.

In the bonding head 101 described hereinabove, as is clear from FIG. 8, the pressing face 130a is provided with a non-pressing portion 130d corresponding to a pressing prohibition portion 13b of the face 13a to be pressed of the electronic component 13 in the case where the electronic component 13 has the pressing prohibition portion 13b at the face 13a thereof from a viewpoint of a quality of the electronic component 13. The non-pressing portion 130d is formed by notching part of the pressing face 130a to correspond to the pressing prohibition portion 13b. In this case, it is preferred to increase an area of the pressing face 130a by an area of the non-pressing portion 130d so as to generate to the pressing part 110 the rotational force to make the pressing face 130a and the stage face 16a parallel at the parallel adjustment operation. The turning moment to be generated to the pressing part 110 at the parallel adjustment operation increases in comparison with the conventional art if the pressing face 130a is formed in the above size. Arranging the pressing face 130a and the stage face 16a in the parallel state is facilitated accordingly.

Hereinbelow will be described modified examples of the above bonding head 101.

For the wiring lines 137 and 138, materials permitting the parallel adjustment, e.g., soft materials such as silicone or the like can be used as a coating material or sheath material therefor. According to the above construction, since the arrangement suppresses limits on the movement of the pressing part 110 due to a hardness of the wiring lines 137 and 138, the pressing part 110 is enabled to smoothly move and the restricting force of blocking the swing of the pressing part 110 at the parallel adjustment operation can be further reduced. Bonding can be carried out with a higher bonding quality.

Figure 3:
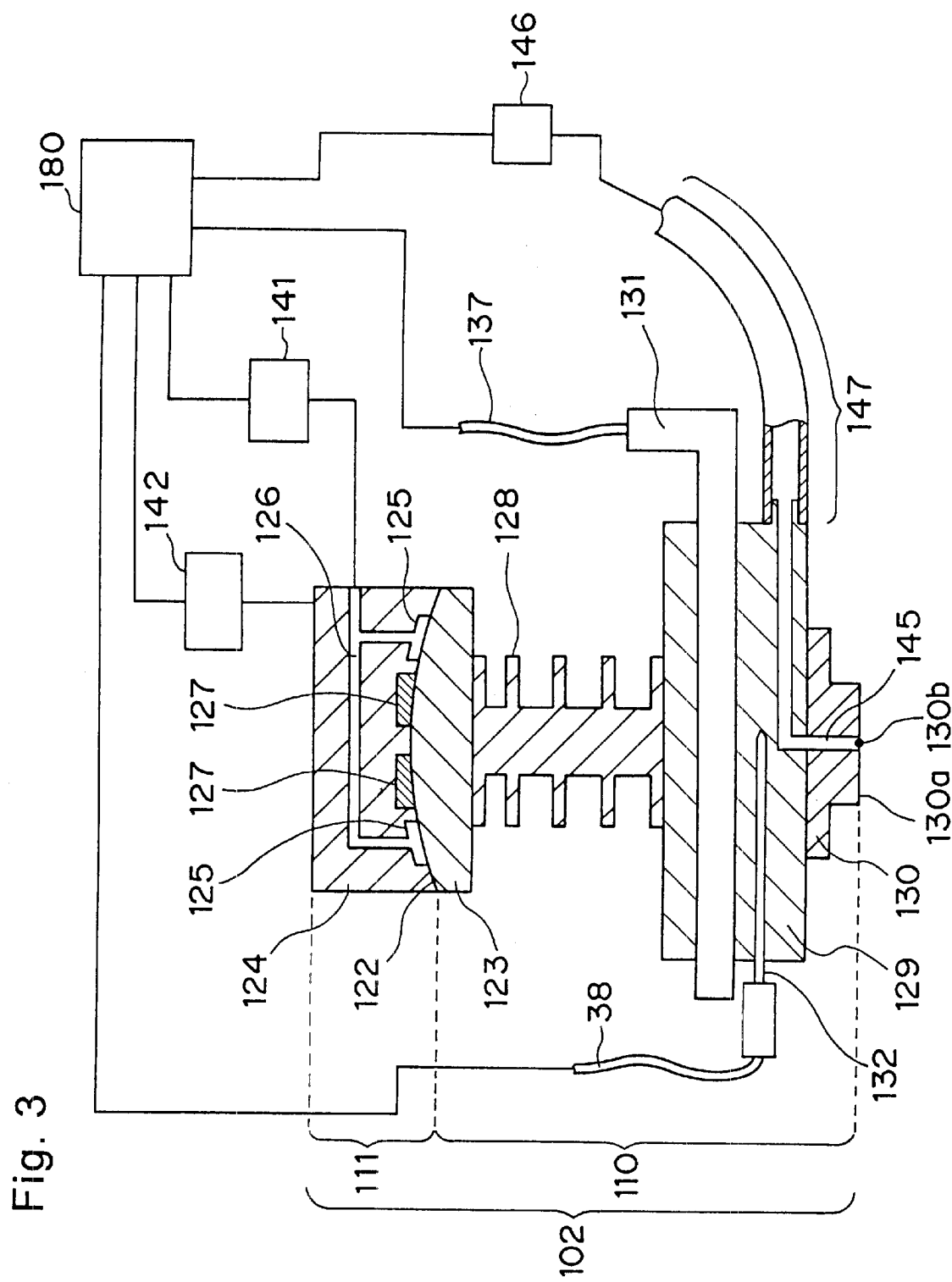
FIG. 3 is a sectional view of a first modified example of the bonding head of FIG. 1.

A bonding head 102 shown in FIG. 3 may be constituted. The bonding head 102 has a component suction passage 145 formed to the heating member 129 and the pressing tool 130, which is opened to the pressing face 130a to suck the electronic component 13 to the pressing face 130a. A suction device 146 is connected via a piping 147 to the component suction passage 145. A material permitting the parallel adjustment, for instance, a soft material such as silicone or the like, or a material of a small diameter is used for the piping 147. Other constructions of the bonding head 102 are constructed in the same manner as the above-described bonding head 101.

According to the constitution of the bonding head 102, since restrictions on the movement of the pressing part 110 by a hardness of the piping 147 are lessened, the pressing part 110 can smoothly move and the restricting force of restricting the swing of the pressing part 110 at the parallel adjustment can be reduced. Accordingly, high-quality bonding is achieved even with the component suction passage 145 and the piping 147 connected to the bonding head.

Figure 4B:
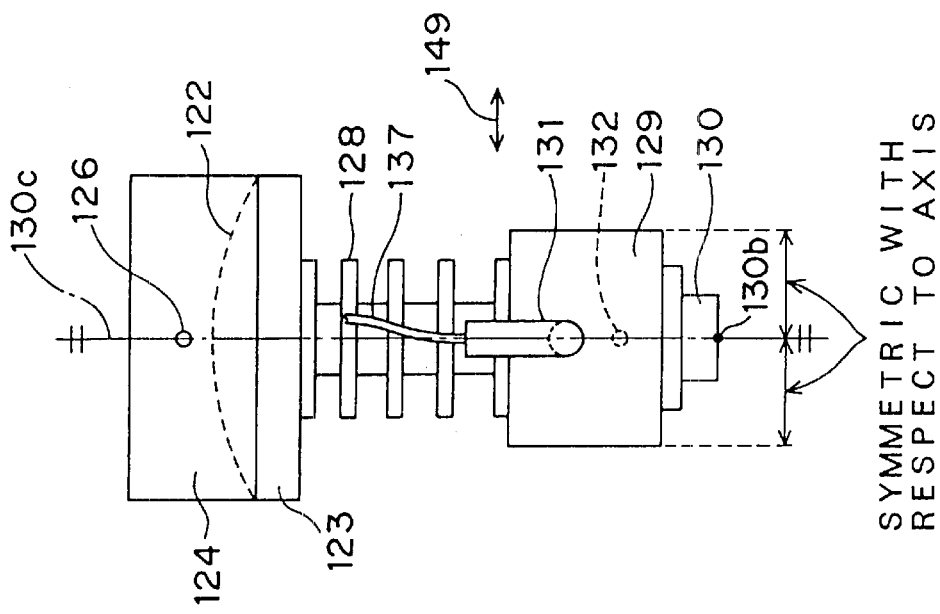
FIG. 4B is a side view of a second modified example of the bonding head of FIG. 1.
Figure 4A:
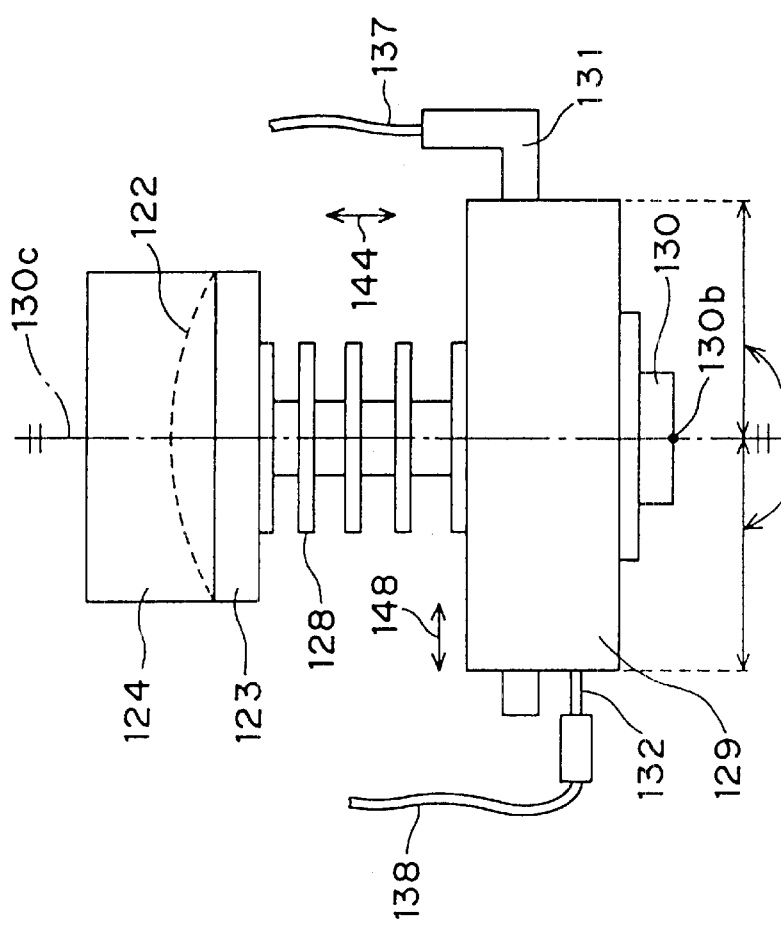
FIG. 4A is a front view of a second modified example of the bonding head of FIG. 1.

The heating member 129 in the bonding head 101 or 102 may be formed into a nearly symmetric shape with respect to two directions 148 and 149 each orthogonal to the thickness direction 144 and mutually orthogonal to each other, as is illustrated in FIGS. 4a and 4b. A weight balance of the heating member 129 in the two directions 148 and 149 is obtained by this form. More specifically, as shown in FIG. 4A, the heating member 129 when disposed in parallel to the direction 148 can be formed to be symmetric with respect to a center axis 130c passing the center point 130b of the pressing face 130a in the direction 148, and as shown in FIG. 4B, with respect to the center axis 130c in the direction 149. Also the heater 131 and the thermocouple 132 are arranged to extend in parallel to the direction 148 while being penetrated by the axis 130c as shown in FIG. 4B.

If the heating member 129 is shaped as above, the heating member 129 is prevented from inclining to the directions 148 and 149 orthogonal to the thickness direction 144 even when the pressing part 110 is in a state to be able to swing to the supporting part 111. The restricting force of restricting the swing of the pressing part 110 equipped with the heating member 129 during the parallel adjustment operation is reduced furthermore. The pressing face 130a and the stage face 16a can be surely made parallel, thereby ensuring a sufficient parallelism for the electronic component 13 to the circuit board 15 at the bonding operation. Bonding can be carried out with a much higher bonding quality.

Figure 5:
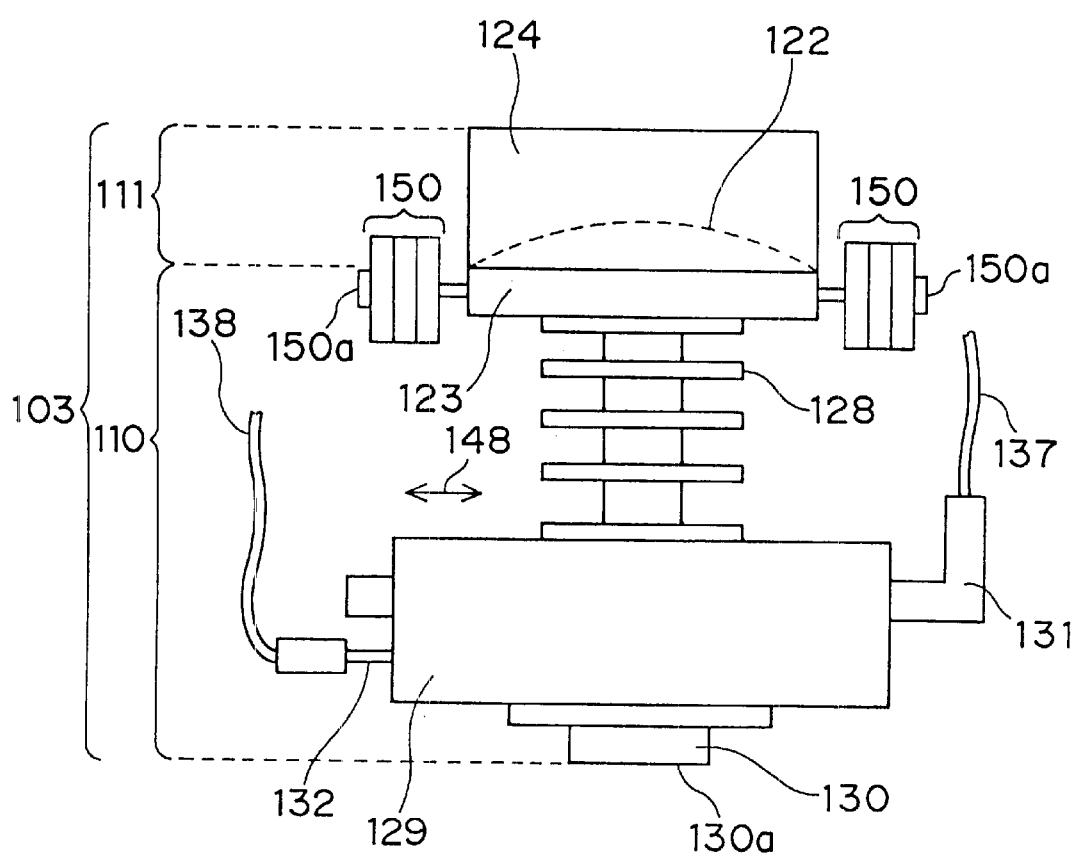
FIG. 5 is a front view of a third modified example of the bonding head of FIG. 1.

The bonding head may be modified to a bonding head 103 shown in FIG. 5. In this bonding head 103, shafts 150a projecting to each other in opposite directions from the projecting block 123 in parallel to the direction 148 in which the heating member 129 extends are respectively equipped with weights 150. The weights 150 adjust a weight balance of the pressing part 110 in the direction 148. The shafts 150a and the weights 150 correspond to examples of the inclination prevention member, which are enough to generate to the pressing part 110 the rotational force for arranging the pressing face 130a and the stage face 16a to be nearly parallel to each other. Therefore, the directions of the projection of the shafts 150a are not limited to the above directions and may not be always opposite to each other. In addition, the number of the shafts 150a is not limited to the illustrated two and also the weights 150 are not required to be equal in weight. The constitution of the bonding head 103 in other points is the same as that of the bonding head 101.

In the case of forming the bonding head 103 as above, the weight balance of the pressing part 110 can be adjusted in directions orthogonal to the thickness direction 144, so that the pressing face 130a can be prevented from inclining even when the pressing part 110 becomes swayable to the supporting part 111. Thus the restricting force of restricting the swing of the pressing part 110 having the heating member 129 at the parallel adjustment operation can be reduced more. Therefore the pressing face 130a and the stage face 16a can be surely made parallel and the parallelism of the electronic component 13 to the circuit board 15 at the bonding operation is secured enough, thus enabling further high-quality bonding.

Figure 6:
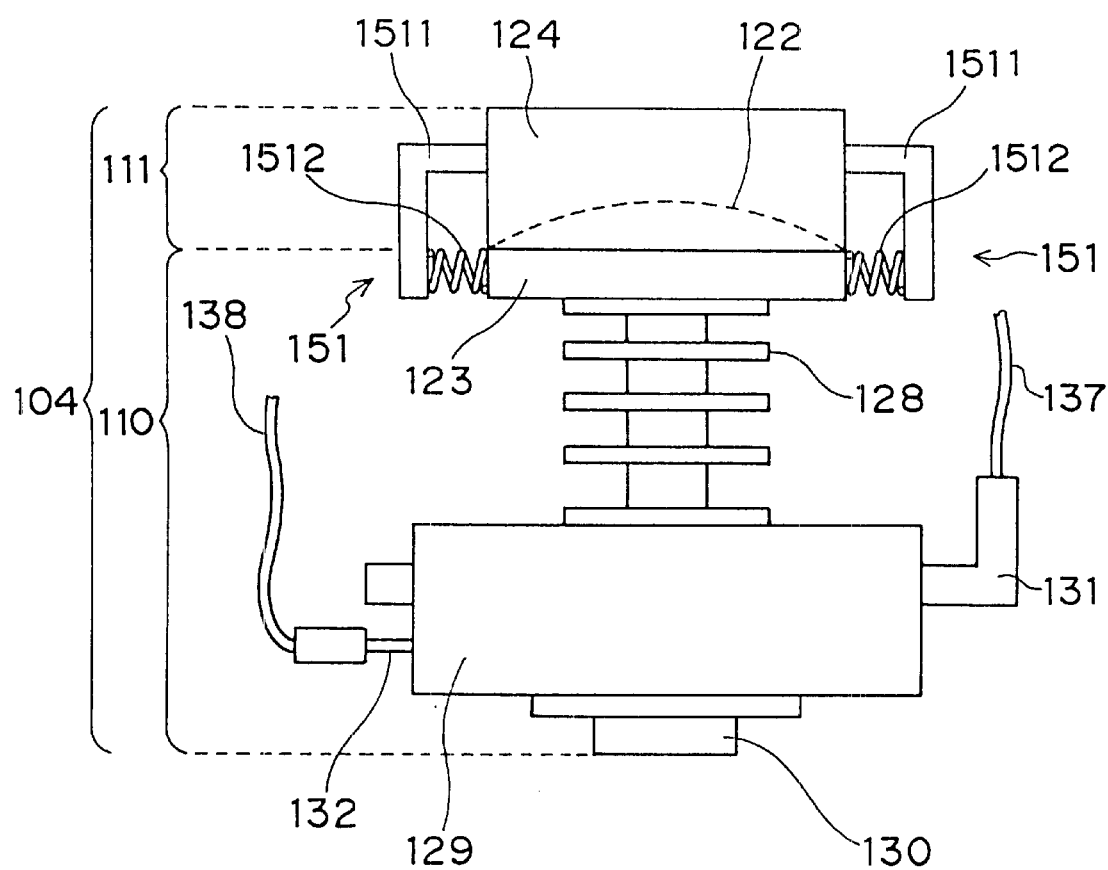
FIG. 6 is a front view of a fourth modified example of the bonding head of FIG. 1.

A bonding head 104 indicated in FIG. 6 may also be formed. Specifically, the bonding head 104 is provided with a pair of urging mechanisms 151 each of which corresponds to an example of the inclination prevention member. The urging mechanisms 151 are attached to the supporting part 111 and each urging mechanism 151 applies the rotational force which brings the pressing part 130a and the stage face 16a into an almost parallel state to the pressing part 110. Each urging mechanism 151 includes a supporting member 1511 and an urging member 1512. Each of the supporting member 1511 has one end fixed to the recessed block 124 and the other end fitted to the urging member 1512. Each of the urging member 1512 acts an urging force to the projecting block 123 with one end of the urging member 1512 fixed by the other end of the supporting member 1511. Although a spring is used by way of example for the urging member in the embodiment as indicated in the drawing, needless to say, the urging member 1512 is not limited to the spring. At the same time, the number of the urging mechanisms 151 is not limited to the pair as illustrated and the urging force of each urging member 1512 may be different in some cases. The bonding head 104 is constructed the same in other points as the bonding head 101.

According to the bonding head 104 formed as above, the pressing part 110 can be urged by the urging members 1512 in orthogonal directions to the thickness direction 144. Thus the rotational force for arranging the pressing face 130a and the stage face 16a to be parallel or nearly parallel can be applied to the pressing part 110. Therefore, the pressing face 130a can be prevented from inclining even when the pressing part 110 becomes able to swing to the supporting part 111. The restricting force of restricting the swing of the pressing part 110 including the heating member 129 at the time of the parallel adjustment operation can be reduced more, so that the pressing face 130a and the stage face 16a are surely made parallel to each other. The parallelism of the electronic component 13 to the circuit board 15 during the bonding operation can be sufficiently secured, enabling much higher quality bonding.

Figure 9:
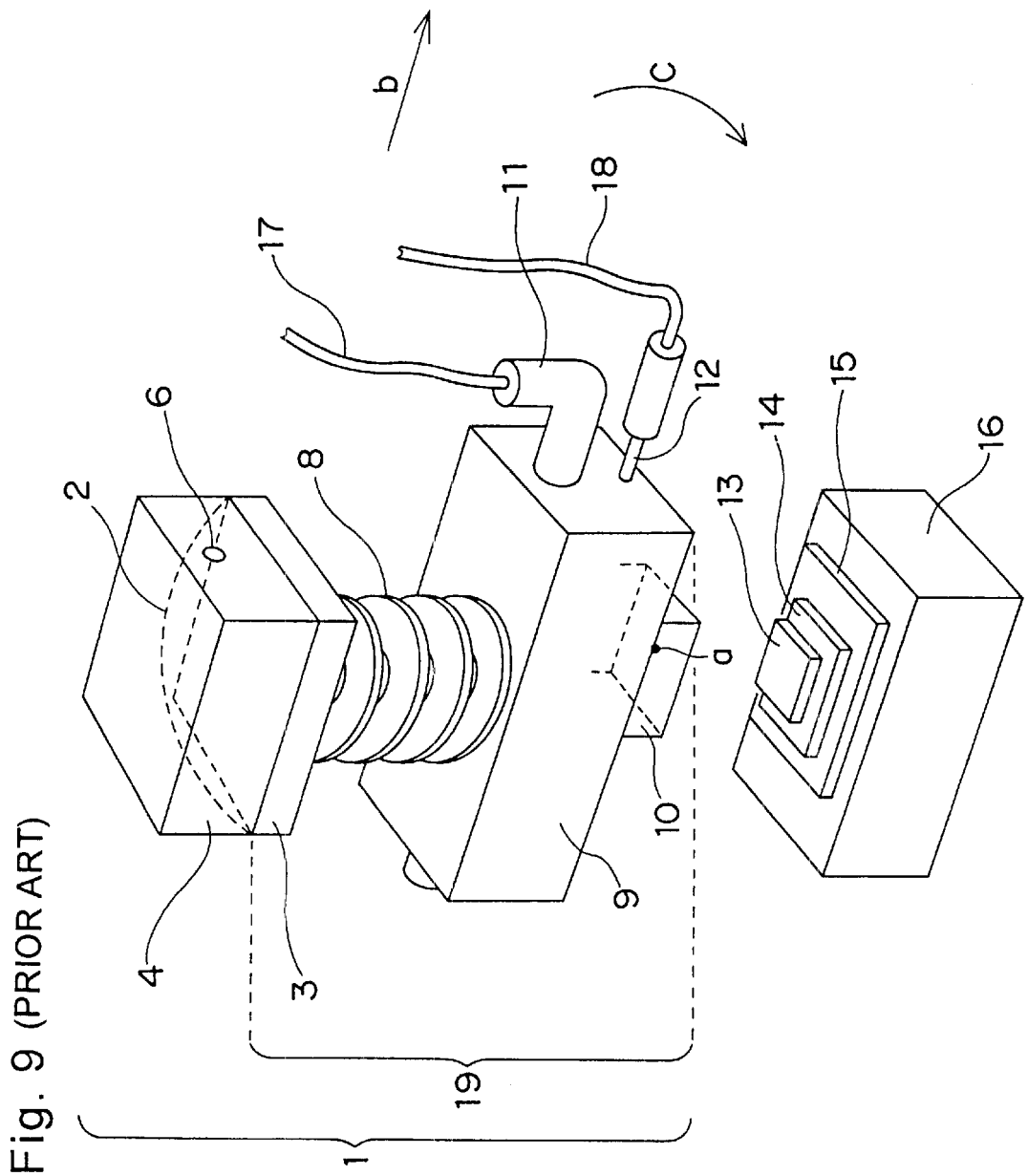
FIG. 9 is a perspective view of a conventional bonding head.
Figure 10:
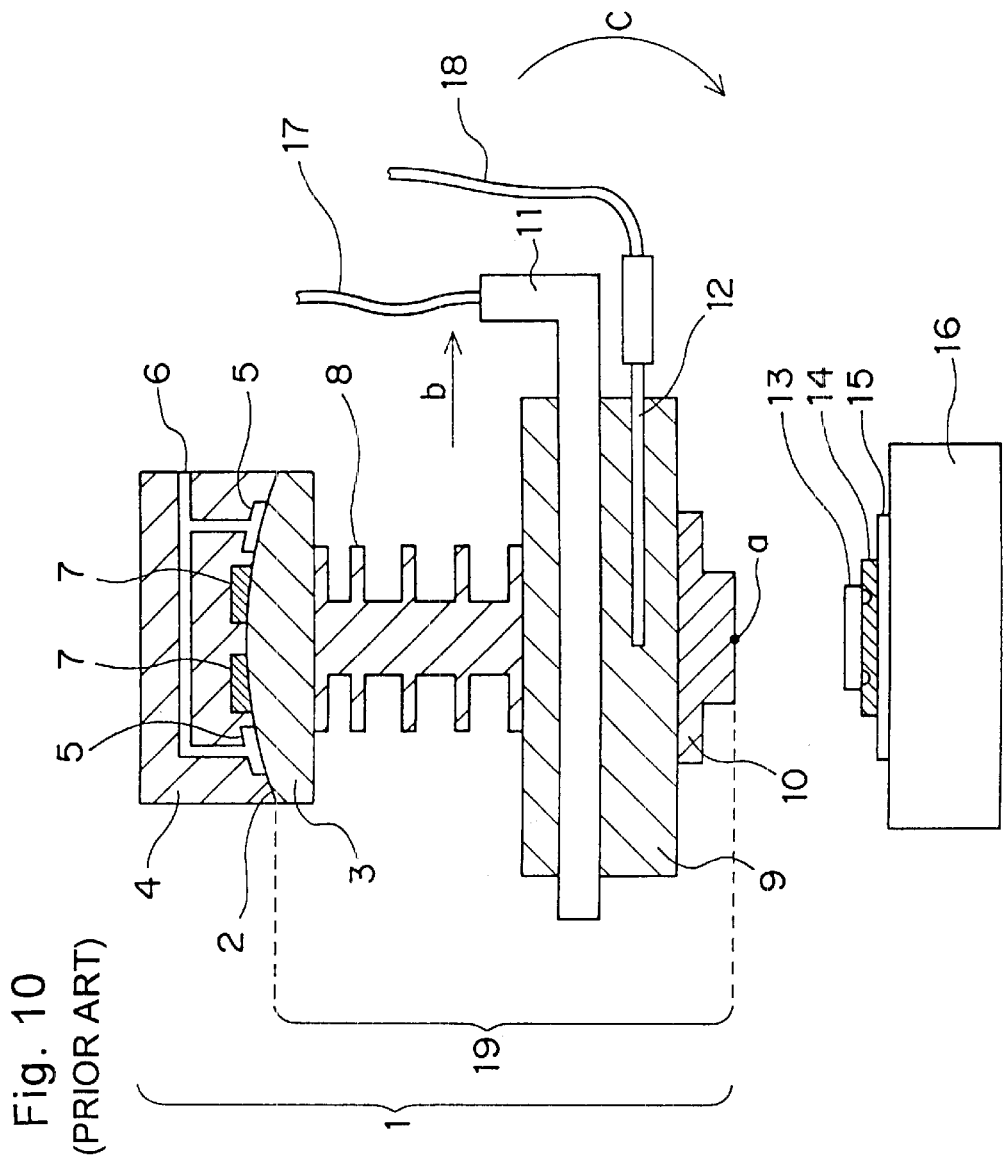
FIG. 10 is a sectional view of the bonding head shown in FIG. 9.
Figure 11:
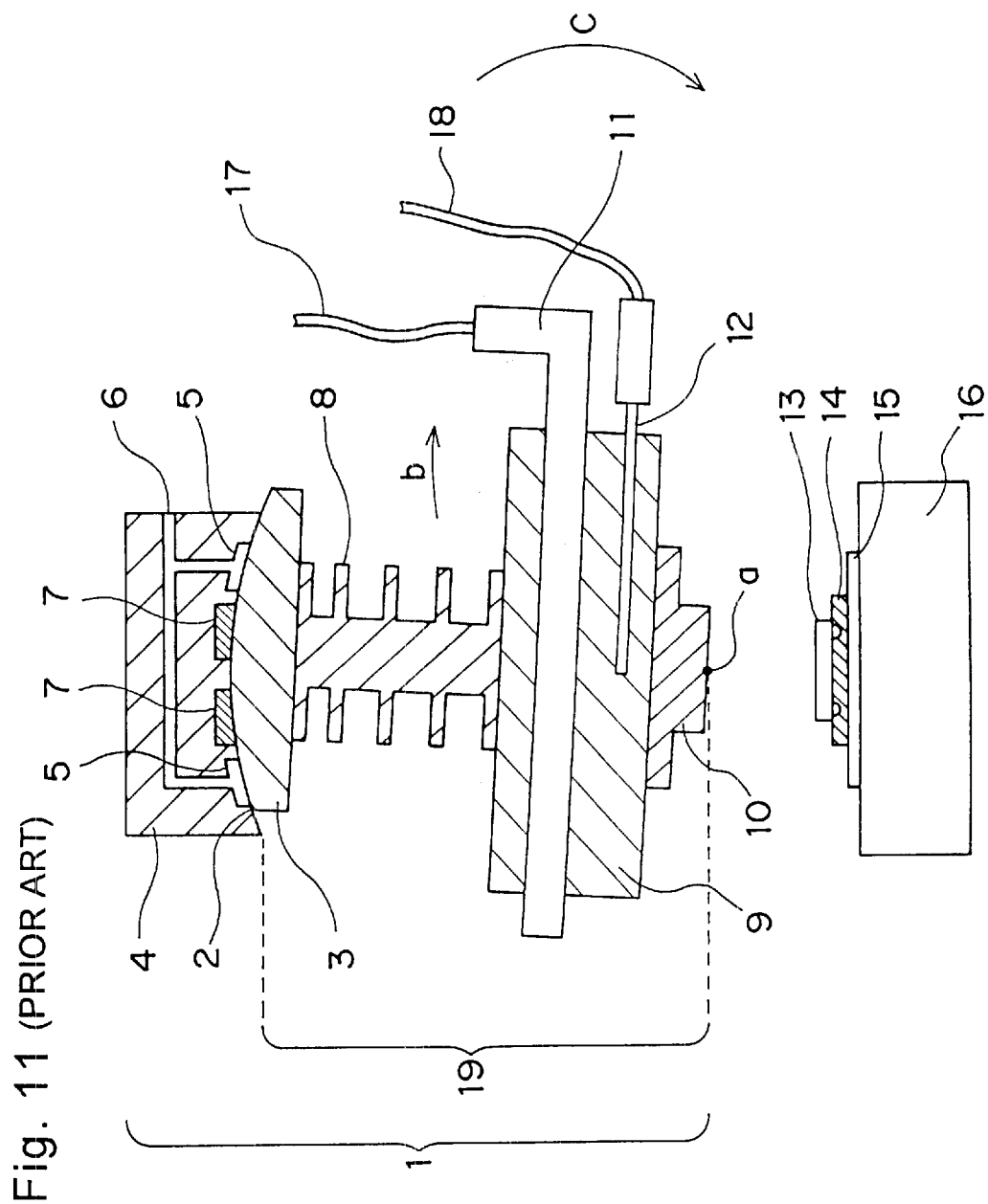
FIG. 11 is a view indicative of a state in which a lower part of the bonding head of FIG. 1 inclines.

The structure in each of the bonding heads 103 and 104 among the above-described modifications is applicable to the conventional bonding head depicted with reference to FIGS. 9–11. In such case, the pressing face 130a can be surely arranged parallel to the stage face 16a. Thus the parallelism of the electronic component 13 to the circuit board 15 at the bonding operation can be sufficiently secured. Bonding can be executed with an even higher quality.

The structure in the bonding heads 103 and 104 can be individually employed or combined one another.

The structure may be combined in any form in the other modifications as well.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A bonding head for pressing a component to a circuit form object with a pressing face brought in contact with the component, which comprises:
   a pressing part having the flat pressing face which comes in contact with the component on a circuit form object placed on a stage face of a bonding stage;
   a supporting part for supporting the pressing part while allowing the pressing part to freely swing; and
   an inclination prevention member for preventing the pressing part from inclining to the supporting part in consequence to the swing of the pressing part so as to make the pressing face nearly parallel to the stage face.

2. The bonding head according to claim 1, wherein the inclination prevention member is a heating member for heating the component, which is included in the pressing part, and includes a heating element for heating the pressing face and a heat detector for detecting heat caused by the heating element thereby controlling a temperature of the heating element, to which the heating element and the heat detector are loaded with directions to offset the swing of the pressing part brought about by the heating element and the swing of the pressing part brought about by the heat detector.

3. The bonding head according to claim 2, wherein a coating material of wiring lines connected to the heating element and the heat detector is formed of a material permitting a parallel adjustment operation to the pressing part, the operation making the pressing face and the stage face parallel to each other when the pressing face is brought in contact with the stage face.

4. The bonding head according to claim 2, wherein the heating member is symmetric with respect to a center axis of the heating member in two mutually orthogonal directions each orthogonal to a thickness direction of the component to be pressed by the pressing face.

5. The bonding head according to claim 3, wherein the heating member is symmetric with respect to a center axis of the heating member in two mutually orthogonal directions each orthogonal to a thickness direction of the component to be pressed by the pressing face.

6. The bonding head according to claim 2, wherein the pressing face has a size which is larger than an entire face of the component and makes the pressing part generate a rotational force for allowing the pressing face and the stage face to be parallel when the pressing face is brought in contact with the stage face.

7. The bonding head according to claim 3, wherein the pressing face has a size which is larger than an entire face of the component and makes the pressing part generate a rotational force for allowing the pressing face and the stage face to be parallel when the pressing face is brought in contact with the stage face.

8. The bonding head according to claim 4, wherein the pressing face has a size which is larger than an entire face of the component and makes the pressing part generate a rotational force for allowing the pressing face and the stage face to be parallel when the pressing face is brought in contact with the stage face.

9. The bonding head according to claim 6, wherein the pressing face has a non-pressing portion corresponding to a pressing prohibition portion in a case where the component includes the pressing prohibition portion.

10. The bonding head according to claim 2, wherein the inclination prevention member is a weight attached to the pressing part for making the pressing part generate a rotational force for allowing the pressing face and the stage face to be nearly parallel.

11. The bonding head according to claim 3, wherein the inclination prevention member is a weight attached to the pressing part for making the pressing part generate a rotational force for allowing the pressing face and the stage face to be nearly parallel.

12. The bonding head according to claim 4, wherein the inclination prevention member is a weight attached to the pressing part for making the pressing part generate a rotational force for allowing the pressing face and the stage face to be nearly parallel.

13. The bonding head according to claim 6, wherein the inclination prevention member is a weight attached to the pressing part for making the pressing part generate a rotational force for allowing the pressing face and the stage face to be nearly parallel.

14. The bonding head according to claim 2, wherein the inclination prevention member is an urging mechanism attached to the supporting part for applying to the pressing part a rotational force for allowing the pressing face and the stage face to be nearly parallel.

15. The bonding head according to claim 3, wherein the inclination prevention member is an urging mechanism attached to the supporting part for applying to the pressing part a rotational force for allowing the pressing face and the stage face to be nearly parallel.

16. The bonding head according to claim 4, wherein the inclination prevention member is an urging mechanism attached to the supporting part for applying to the pressing part a rotational force for allowing the pressing face and the stage face to be nearly parallel.

17. The bonding head according to claim 6, wherein the inclination prevention member is an urging mechanism attached to the supporting part for applying to the pressing part a rotational force for allowing the pressing face and the stage face to be nearly parallel.

18. The bonding head according to claim 2, wherein, when the heating member further includes a suction passage opened to the pressing face for sucking the component to the suction face, the inclination prevention member is a tubular member which is attached to the heating member, communicates with the suction passage and is formed of a material or in a size to prevent the inclination.

19. A component mounting apparatus which comprises:
   a bonding head for pressing a component to a circuit form object with a pressing face brought in contact with the component, the bonding head including:
      a pressing part having the flat pressing face which comes in contact with the component on a circuit form object placed on a stage face of a bonding stage,
      a supporting part for supporting the pressing part while allowing the pressing part to freely swing, and
      an inclination prevention member for preventing the pressing part from inclining to the supporting part in consequence to the swing of the pressing part so as to make the pressing face nearly parallel to the stage face; and
   a transfer device for feeding the circuit form object with the component placed thereon onto the stage face of the bonding stage and sending out the circuit form object from the stage face,
   wherein the component on the circuit form object fed onto the stage face by the transfer device is mounted on the circuit form object while pressing by the bonding head.

20. The component mounting apparatus according to claim 19, which further includes a driving device for moving the bonding head in a thickness direction of the component and a controller for controlling the driving device to operate, wherein the controller controls the driving device to move the bonding head in the thickness direction with a larger force at a parallel adjustment operation when the flat pressing face which is to come in contact with the component is brought in contact with the stage face to make the pressing face and the stage face parallel than a force at a pressing operation when the pressing face is brought in contact with the component to press the component to the circuit form object.

* * * * *